United States Patent [19]
Elliott et al.

[11] Patent Number: 5,553,015
[45] Date of Patent: Sep. 3, 1996

[54] EFFICIENT FLOATING POINT OVERFLOW AND UNDERFLOW DETECTION SYSTEM

[75] Inventors: Timothy A. Elliott; Christopher H. Olson, both of Austin, Tex.; Frank J. Palermo, Old Tappan, N.J.

[73] Assignee: International Business Machines Corporation, Armonk, N.Y.

[21] Appl. No.: 228,480

[22] Filed: Apr. 15, 1994

[51] Int. Cl.⁶ ........................................................ G06F 7/00
[52] U.S. Cl. ........................................ 364/748; 364/715.04
[58] Field of Search .................................... 364/715.04, 736.5, 364/737, 745, 748, 736

[56] References Cited

U.S. PATENT DOCUMENTS

| | | | |
|---|---|---|---|
| 4,429,370 | 1/1984 | Blau et al. | 364/748 |
| 4,442,498 | 4/1984 | Rosen | 364/745 |
| 4,528,640 | 7/1985 | Criswell | 364/737 |
| 4,534,010 | 8/1985 | Kobayashi et al. | 364/748 |
| 4,590,584 | 5/1986 | Kiichiro . | |
| 4,649,508 | 3/1987 | Kanuma | 364/748 |
| 4,779,220 | 10/1988 | Nukiyama | 364/748 |
| 5,038,313 | 8/1991 | Kojima | 364/736.5 |
| 5,038,314 | 8/1991 | Kelleher | 364/745 |
| 5,117,384 | 5/1992 | Drehmel et al. | 364/748 |
| 5,164,914 | 11/1992 | Anderson | 364/745 |
| 5,222,240 | 6/1993 | Patel | 395/775 |
| 5,257,216 | 10/1993 | Sweedler | 364/748 |
| 5,267,186 | 11/1993 | Gupta et al. | 364/748 |
| 5,272,660 | 12/1993 | Rossbach | 364/748 |
| 5,309,383 | 5/1994 | Kuroiwa | 364/748 |

FOREIGN PATENT DOCUMENTS

| | | |
|---|---|---|
| 256358 | 2/1988 | European Pat. Off. . |
| 472148 | 2/1992 | European Pat. Off. . |
| 3931545 | 3/1990 | Germany . |

*Primary Examiner*—Roy Envall
*Assistant Examiner*—Chuong D. Ngo
*Attorney, Agent, or Firm*—Mark E. McBurney

[57] ABSTRACT

A processing system that determines whether an underflow or overflow condition has occurred concurrently with the determination of the floating point exponent result uses a group of latched constants which can be added to the intermediate exponent and the exponent adjust to determine out of range conditions for all cases. The appropriate one of these latched constants (exponent range check values; exp_range_chk) are added to the exp_int and exp_adjust to give a value that will vary based on whether the exp_result is out of range, or not. Different exp_range_chk values are used for underflow single precision, underflow double precision, overflow single precision and overflow double precision. The sum of these three values (exp_int, exp_adj, exp_range_chk) will yield a binary number having a most significant bit (MSB) that is dependent upon the exp_result value. More particularly, the MSB will be a logical 1 when an out of range condition has occurred and a logical 0 for normal in range exponent results.

16 Claims, 4 Drawing Sheets

```
/* overflow double range check vs + 1023 in 13 bit extended format */
OVFL_D:=    FIC_WB_VALID & ^FWC_SINGLE &
            FEO_EXP_RESULT(0) &
             (FEO_EXP_RESULT(1) |
            FEO_EXP_RESULT(2) |
             FEO_EXP_RESULT(3) & FEO_EXP_RESULT(4) &
            FEO_EXP_RESULT(5) & FEO_EXP_RESULT(6) &
            FEO_EXP_RESULT(7) & FEO_EXP_RESULT(8) &
            FEO_EXP_RESULT(9) & FEO_EXP_RESULT(10) &
            FEO_EXP_RESULT(11) & FEO_EXP_RESULT(12)))
```

PRIOR ART

FIG. 2

The following table presents several examples of how the algorithm works:

| precision (sng/dbl) | exp_int (biased) | exp_adj (normalize) | exp_mg_chk (constants) | res of add (in binary) | out of range detection |
|---|---|---|---|---|---|
| sng | +140 | -10 | -127 (no bias) | +3=1000 0010 | yes |
| sng | +140 | -20 | -127 (no bias) | -7=0111 1000 | no |
| sng | +140 | -13 | -127 (no bias) | 0=0111 1111 | no |
| sng | -100 | -10 | +126 - bias | +16=0001 0000* | no |
| sng | -100 | -30 | +126 - bias | -4=1111 1100* | yes |
| dbl | +1024 | -10 | -1023 (no bias) | -9=011 1111 0111 | no |
| dbl | +1024 | 0 | -1023 (no bias) | +1=100 0000 0000 | yes |
| dbl | -1020 | -20 | +1022 - bias | -18=111 1110 0110* | yes |
| dbl | -1000 | -12 | +1022 - bias | +10=000 0000 1010* | no |

The four (4) hardware constants needed are therefore as follows:

| detection type | constant | |
|---|---|---|
| overflow single | -127 | |
| overflow double | -1023 | |
| underflow single | +126 - bias | (note bias = +127) |
| underflow double | +1022 - bias | (note bias = +1023) |

FIG. 4

EFFICIENT FLOATING POINT OVERFLOW AND UNDERFLOW DETECTION SYSTEM

BACKGROUND OF THE INVENTION

1. Field of the Invention

The present invention relates to an apparatus and method for determining, in a pipelined processing unit, when a floating point operation yields either an overflow or underflow (out of range) condition. More particularly, an operation to determine the out of range condition is implemented in parallel with computation of the floating point value.

2. Description of Related Art

Many pipelined processing systems use a "hold writeback" operation as a means of ensuring that a continuous flow of instructions is maintained through the system. One of the major difficulties in these types of pipelined execution units is the timing path associated with holding the last stage of the pipeline. Once the last stage is held (typically the writeback stage), it is necessary to send that hold signal back up to all of the previous pipeline stages, This makes the timing of the "hold writeback" stage extremely critical. Therefore, in order to improve the timing of the "hold writeback" equation, it is necessary to determine which dominant term, or terms are causing the timing problems, The major dominant term(s) affecting the "hold writeback" equation were found to be in the detection of overflow and underflow conditions. These out of range conditions indicate that exponent result (exp_result) of the value yielded by the floating point operation is either too large (overflow) or too small (underflow). Generally, there are two separate precision cases that must be considered. The single precision case has an exponent range of −126 to +127, while the double precision case has a range of −1022 to +1023. Thus, there are two types of overflow and underflow situations which must be considered, i.e. underflow single precision and double precision, as well as overflow single and double precision.

The present invention allows the time required to detect underflow and overflow conditions to be minimized. A small additional amount of hardware is added, but the complexity of the detection scheme is reduced when compared to prior art underflow and overflow detection systems.

Referring to FIGS. 1 and 2, a conventional hardware implementation of an underflow and overflow detection scheme is illustrated. FIG. 1 includes range checking logic for each possible out of range result, e.g. underflow single, underflow double, overflow single, overflow double. Additionally, an input is provided for a special degate in the case of any special numbers, such as infinity, not a number (NAN), zeros, or the like.

Those skilled in the art will understand that the standard format for a floating point number is in the form of 1.[nnnnnn ... m] $*2^{exp}$, where n equals a either a binary 1 or 0 and m is equal to the number of bits utilized by the system. The exponent (exp) is equal to a binary number. In the preferred embodiment of the present invention, m is equal to 23 bits for single precision and 52 bits for double precision. The exp is equal to 8 bits for single precision and 11 bits for double precision. It can be seen that 8 bits will give 256 values ($2^8$). As noted above the single precision exponent value range is from −126 to +127 which corresponds to 254 values, the other two values (all zeros and all ones) are used for special cases. For example, if the exponent of the floating point number is all zeros and the fractional portion is also all zeroes then the number is a logical zero. When the exponent is all zeros and the fraction is not all zeros, then the number is a denormalized number in accordance with the IEEE Standard for Floating Point Arithmetic. When the exponent is all ones and the fraction is all zeros, the number is infinity. And, when the exponent is all ones and the fraction is not all zeros the result is not necessarily a number (NAN). For a double precision exponent equal to 11 bits ($2^{11}$) there are 2046 values, which corresponds to the double precision range of −1022 to +1023.

Assume that a floating point double precision multiply operation is to occur. For example, (1.0 * $2^{1023}$) multiplied by (1.0 * $2^{1023}$) will equal 1.0 * $2^{2046}$, since the exponents are added. Thus, for a double precision floating point operation, this multiplication will render an out of range value, i.e. 2046 is not within −1022 to +1023. In this case the processing system will need to issue a "hold writeback" signal to keep additional instructions from entering the pipeline. Furthermore other processing operations, which are outside the scope of the present invention, must be implemented in order to correct the out of range value. These operations are specified in the IEEE/ANSI Standard 754-1985, "IEEE Standard for Binary Floating Point Arithmetic".

Those skilled in the art will also understand that normalization of a floating point number also must be accounted for. That is, assume the following operation: (1.00101 * $2^3$)−(1.00100 * $2^3$). The resulting value will be 0.00001 * $2^3$. In order to normalize the number the binary point must be moved 5 places to the right in order to get the floating point number in the proper 1.nnnn ... m $*2^{exp}$ form. This will change the exponent by adding a negative 5 (−5) to 3, giving a negative 2 (−2). In this example the exponent value, +3 is the intermediate exponent (exp_int) and the exponent value, −5 is the exponent adjust number (exp_adjust).

Referring more specifically to FIG. 1, a conventional underflow and overflow range checking mechanism is shown by reference numeral 1. Register 3 is used to store the intermediate exponent value and register 5 stores the exponent adjust value. These values are then added by a carry lookahead adder 7. The resulting exponent is the sum of the exponent adjust and intermediate exponent, output from adder 7. A two's complement addition scheme is used by adder 7, as noted by the +1. This method is well known in the art and allows an adder to perform binary subtraction. For example assume it is desired to subtract the binary number 0101 (decimal 5) from binary 0011 (decimal 3). Using the two's complement method, the binary 1 values are interchanged with the binary 0 values, for the number being subtracted (in this case 1010), and a +1 is then added to the result, yielding 1011. This new, two's complement number (1011), is then added to the number being subtracted from, i.e. 0011. In this case, adding binary number 0011 (decimal 3) and the two's complement of 0101 (decimal 5), which is 1011, gives the result of 1110, or decimal −2. Thus, it can be seen how the two's complement method allows binary subtraction using only an adder circuit. This method is utilized by the present invention to allow a range checking value to be added to the intermediate exponent and the exponent adjust in order to obtain a checking point that transitions about zero. The present invention will be described in more detail below with regard to FIG. 3.

The resulting value (exp_result) from adder 7 is then checked for an out of range condition. For example, in a single precision floating point operation, the exponent result would be input to comparators 9 and 13. These comparators check to see if the exp_result is within the range, e.g. −127 to +126. Similarly in a double precision floating point operation, the exp_result value is input to comparators 11 and 15 to see if the value is within the range −1023 to +1022.

FIG. 2 shows an example of the logical steps required by each comparator 9, 11, 13, 15 to determine if the exponent result is out of range. In particular, the overflow double comparator 15 will implement the steps shown in FIG. 2 to determine if the exp_result is greater than +1023. It can be seen that using this logic to determine the out of range condition will use a significant amount of time. A gate delay of 3–4 levels (at approximately 0.3 nanoseconds per gate) is required to determine the out of range conditions using the prior art circuit of FIG. 1.

Referring again to FIG. 1, the comparators 9, 11, 13, 15 are grouped together based on whether they check for underflow or overflow. Comparators 9 and 11 determine if an underflow condition exists, while comparators 13 and 15 look for overflow. The outputs of comparators 9 and 11 are input to an OR gate 17. When either of the signals output from these comparators is valid (i.e. an underflow exists), then a valid signal is output from OR gate 17 to an exponent underflow (exp_undfl) AND gate 21. Similarly, the outputs of overflow comparators 13 and 15 are sent to OR gate 19. Again, when either of these signals is valid (an overflow exists), then a valid signal is output from OR gate 19 to exponent overflow (exp_ovfl) AND gate 23. It can be understood that a floating point operation will either be single precision or double precision, but not both. Therefore, a signal will only be provided from one of the underflow comparators 9 and 11, and the overflow comparators 13 and 15.

In addition to the output from OR gates 17 and 19, a special case degate signal (e.g. infinity, NAN, zero) is inverted and input to AND gates 21 and 23. Under normal circumstances, this will cause a valid signal to input to AND gates 21 and 23. In this manner, when a valid signal is output from either OR gate 17 or 19, two valid signals will be ANDed together at gates 21 and 23 with the special case degate signal giving a valid signal output to a three-port OR gate 25. It can be seen how a single exponent result can only be considered an underflow or overflow, but not both. That is the exp_result will either be out of range in the negative direction (less than −127 for single precision or less than −1023 for double precision) or out of range in the positive direction (greater than +126 for single precision or greater than +1022 for double precision). Thus, the outputs of the AND gates 21 and 23 must be ORed together to ensure that either out of range condition will be detected. The other input to OR gate 25 is for any other conditions which may occur that would require the processor to hold the floating point writeback signal. Therefore, in the prior art system of FIG. 1, if either of the signals from AND gates 21, 23 are valid, then a valid signal will be output from OR gate 25 indicating that an out of range condition has occurred in the floating point exp_result and the writeback stage will be held.

It can be seen that a substantial amount of processing overhead is required to implement the logic of FIG. 2 since at least 3–4 gate delays (at 0.3 ns per gate) are required at comparators 9, 11, 13, 15, and the out of range condition is determined subsequent to computation of the exponent result. Thus, a system that would determine whether an out of range condition has occurred without incurring the time penalty required by the comparators of the prior art systems would be desirable.

SUMMARY OF THE INVENTION

In contrast to the prior art, the present invention allows the processing system to determine whether an underflow or overflow condition has occurred concurrently with the determination of the floating point exponent result.

Broadly, the present invention uses a group of latched constants which can be added to the intermediate exponent and the exponent adjust to determine out of range conditions for all cases. The appropriate one of these latched constants (exponent range check values; exp_range_chk) are added to the exp_int and exp_adjust to give a value that will vary based on whether the exponent result is out of range. Different exp_range_chk values are used for underflow single precision, underflow double precision, overflow single precision and overflow double precision. The sum of these three values will yield a binary number having a most significant bit (MSB) that is dependent upon the exp_result value. More particularly, the MSB will be a logical 1 when an out of range condition has occurred and a logical 0 for normal in range exponent results.

These and other objects, features and advantages will become apparent to those skilled in the art upon considering the subsequent description taken in conjunction with the attached drawings.

BRIEF DESCRIPTION OF THE DRAWINGS

FIG. 2 is a representation of the process steps implemented by the range checking logic of the prior art system;

FIG. 4 is a table of values illustrating various examples of out of range conditions and the result of the detection circuit of the present invention.

DETAILED DESCRIPTION OF THE PREFERRED EMBODIMENTS

Figure 1:
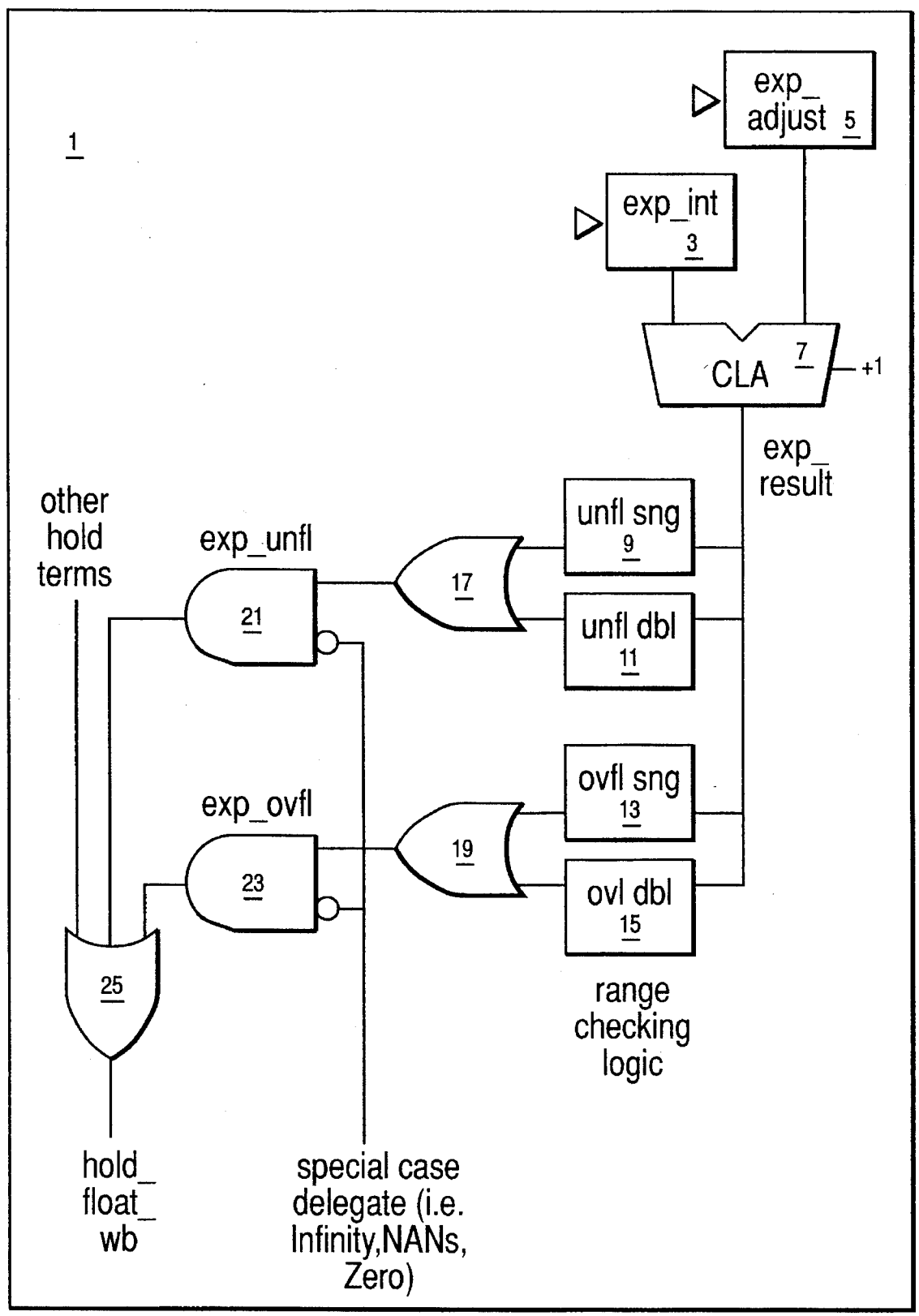
FIG. 1 is a logical diagram illustrating a prior art system that determines if an underflow or overflow condition has for the exponent result of a floating point operation.
Figure 3:
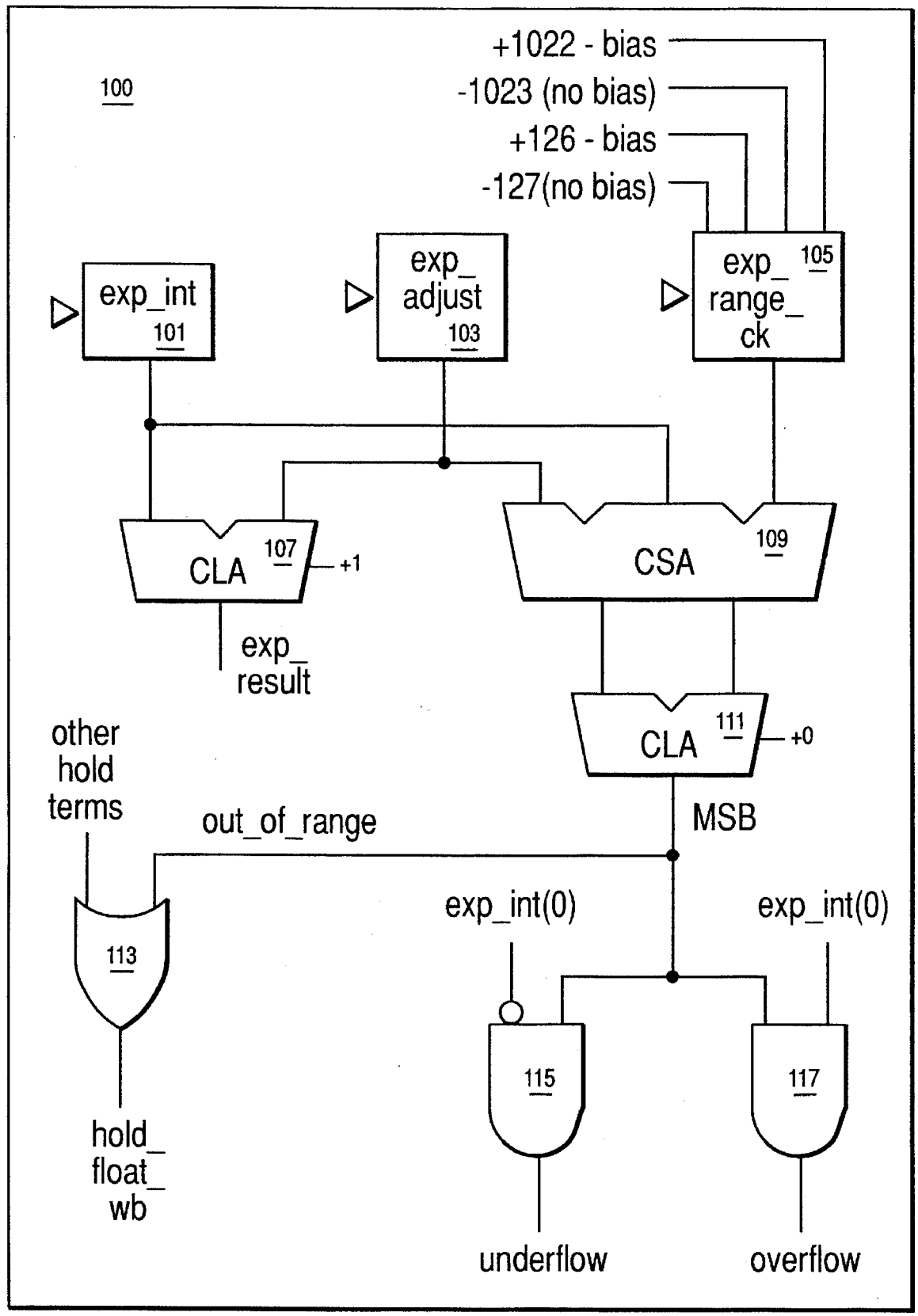
FIG. 3 is a schematic diagram of a preferred embodiment of the underflow and overflow range checking circuit of the present invention.

Referring to FIG. 3, a preferred embodiment of the present invention that will detect out of range conditions for a resulting exponent is shown generally by reference numeral 100. An intermediate exponent register 101 is shown which receives and stores the intermediate exponent from the floating point operation. Register 103 receives and stores the exponent adjust value and register 105 is used to receive the exponent range check values. It can be seen that the four cases in the preferred embodiment (underflow single and double, and overflow single and double) are addressed by the inputs to register 105. Carry lookahead adder 107 is used to add the intermediate exponent and the exponent adjust values to normalize the floating point value and yield the exponent result which is then used by the processing system in other floating point calculations.

Concurrently, the intermediate exponent, exponent adjust and exponent range check values are added by three port adder 109 (known as a carry save adder, or CSA). In the next stage, the resulting two values are added in a carry lookahead adder 111. The output of adder 111 is the range checking value which is a binary number with a MSB that will be a logical 1 for out of range conditions and a logical 0 for in range conditions. That is, the MSB of the range checking value output from adder 111 will toggle between 1 and 0 depending on whether an out of range condition exists.

The MSB is then input to an OR gate 113, along with a signal that will cause the floating point writeback to be held for other reasons. The MSB and the "other" values are then ORed together and if the MSB is a valid signal (logical 1 in the preferred embodiment) then an out of range condition has occurred and the writeback stage is held, based on the valid output from OR gate 113. However, if the MSB is a logical 0, then (unless the "other" signal is valid, which is an infrequent occurrence) the exponent result is in range and the writeback stage is not held, based on the lack of a valid output from OR gate 113.

The present invention, as shown in FIG. 3 not only determines whether an out of range condition has occurred, but also whether the out of range condition is an underflow or overflow. The processing system will already know whether a single precision or double precision floating point operation is being performed, therefore, the only remaining determination is if the out of range condition is underflow or overflow.

AND gates 115 and 117 are provided to determine whether an underflow or overflow condition has occurred. The MSB from adder 111 is provided as an input to both AND gates 115 and 117. Additionally, a value corresponding to the sign of the intermediate exponent is also input to AND gates 115 and 117. That is, the exp_int signal will be logical 1 for positive values and a logical 0 for negative values. The exp_int signal to underflow AND gate 115 is inverted prior to being input, while the exp_int signal is directly input to overflow AND gate 117. Thus, when the MSB is logical 0, indicating that the exponent result is in range, then AND gates 115 and 117 will AND the logical 0 with the inverted exp_int (underflow AND gate 115) and the exp_int to gate 117. Since the MSB is logical zero, neither AND gates 115 and 117 will output a valid signal. This is because no out of range condition exists (MSB=0), therefore, no underflow or overflow has occurred.

However, when the MSB from adder 111 is a logical 1, either an underflow or overflow condition has occurred. In the case where the intermediate exponent was negative, then exp_int(0) will be a logical 0. Thus, a logical 0 will be input to AND gate 117 and a logical 1 will be input to AND gate 115 (the logical 0 was inverted). Since MSB is equal to logical 1, there is a (1, 1) input to AND gate 115 and a (1, 0) input to gate 117. It can be seen that AND gate 115 will output a valid signal since two logical 1's have been ANDed together. In this manner, the circuit of FIG. 3 determines that an underflow out of range condition as occurred.

When the intermediate exponent is positive, a logical 1 is input to AND gate 117 and a logical 0 (inverted logical 1) is input to gate 115. In this case logical (1, 1) is input to AND gate 117 and logical (0, 1) is input to gate 115. Thus, AND gate 117 will output a valid signal indicating that an overflow out of range condition has occurred.

The present invention replaces the conventional hardware range checking logic with a group of latched constants which can be added to the intermediate exponent result (exp_int) and the exponent adjust (exp_adj) to obtain an "out of range" detection for all possible cases. This includes detection of both underflow and overflow for either single and double precision, as well as special case number, such as infinity, zeros, NAN's and the like. In a preferred embodiment, this computation is done in parallel with the calculation of the resulting exponent to save overhead.

By using the predefined constants for the exponent range check, it is possible to avoid use of the combinatorial logic found in prior art system and to perform the range check in parallel with computing the exponent result. As noted previously, the exponent result is computed by subtracting the exponent adjust from the intermediate exponent, i.e. exp_result=exp_int−exp_adj.

As noted, with regard to FIG. 3, the exp_int, exp_adj, and exp_rng_chk are added. Since the exp_adj is in two's complement format, this will have the same effect as subtracting the exp_adj from the exp_int. The MSB of the resultant number will equal logical 1 when the final exponent (exp_result) is out of range and logical 0 when the exp_result is in range.

The present invention utilizes a mechanism whereby a range checking value is added to the exponent adjust and intermediate exponent. This addition is in two's complement form which effectively subtracts the value of the range check from the sum of the exp_adjust and exp_int. More particularly, for overflow (single precision out of range overflow occurs at +127) out of range checking the present invention merely adds the binary number −127 as the exp_range_chk. The previously noted IEEE Standard for Floating Point Arithmetic specifies that all floating point exponents be in a biased format. That is, the intermediate exponent is the actual exponent number, plus a bias (+127 for single precision and +1023 for double precision). Therefore, in the case of single precision overflow out of range checking, the result of the addition of the exp_int, exp_adjust and exp_range_chk will transition about the upper range of +127 by the same amount which the exponent differs from the out of range value of +127. This is extremely important to the present invention because, for single precision numbers, the MSB of an 8 bit binary number becomes logical 1 at the value of +128. And, for single precision overflow an out of range condition occurs at +128. Therefore, for resulting exponents less than +128 the number output from adder 111 will have a MSB of 0 (in range) and those greater than or equal to +128 will correspond to a number with a MSB of 1 (out of range). Thus, depending on the value of the MSB, it can be determined if out of range overflow condition has occurred. Similarly, for double precision (double precision out of range overflow occurs at +1023) the exp_range_chk value of −1023 in binary form is added to the sum of the exp_int and exp_adj to give an exponent that will transition about the overflow out of range value of +1023. The MSB for an 11 bit binary number will become a logical 1 when the number is equal to +1024. Since the overflow double precision out of range condition occurs when exponent result is greater than +1023, it can be seen that a double precision overflow condition can be detected when the MSB of the resulting 11 bit number (output from adder 111 of FIG. 3) is a binary 1. It can be seen that the MSB for the actual binary number of the sum of the exp_int, exp_adj and exp_range_chk will transition about the upper range limit for overflow situations.

For underflow checking (single precision out of range underflow occurs at −126) a +126 less the bias value of +127 is added to the sum of the exp_int and exp_adjust. In this manner, for underflow checking the bias will be subtracted and the sum of the exp_int, exp_adjust and exp_range_chk will transition about zero. For example, to check for out of range underflow single the exp_int (including a bias of +127) will be added with the exp_adj and exp_range_chk. In this case the bias amounts will cancel and the result will be the unbiased sum of the exp_int, exp_adj and exp_range_chk. For resulting numbers that are negative, the two's complement is taken which will result in an 8 bit binary number having a MSB of 1, indicating that an underflow condition has occurred. Since the underflow out of range limit for single precision is −126, then adding a +126 will equal zero. Thus, any intermediate exponent having a value less than −126 will correspond to a negative number and the sum of the exp_int, exp_adj and exp_range_chk will have a MSB equal to 1, indicating an out of range condition. For negative numbers, the two's complement of binary numbers in the range 0 to −126 will give a number with a MSB equal to 1. However, for exponents having values greater than −126, when +126—bias is added, the sum will be greater than or equal to zero and the 8 bit binary number will give a number with the MSB equal to logical 0.

The case of double precision works in exactly the same manner as single precision, except the range limits are −1022 to +1023 and the exp_range_chk value to be added for overflow checking is −1023 (with no bias). For underflow checking the number +1022—bias is used for the range check. For all positive numbers resulting from the sum of the exp_int, exp_adj and exp_rng_chk, up to +1023, the actual 11 bit binary number will yield the desired MSB for in range conditions (logical 0) and out of range conditions (logical 1). In contrast to overflow checking, the two's complement of the number corresponding to the sum of the exp_int, exp_adj and exp_range_chk must be used for negative sums (numbers output from adder 111), since the transition occurs about the origin and negative numbers indicate out of range and must yield a number with MSB equal to "1".

Several examples of the present invention showing how the MSB toggles between "0" and "1" for in range and out of range conditions, respectively, will now be described.

For the sake of simplicity the following examples will only address single precision numbers, however, it can be seen from FIG. 4 that the present invention can be applied equally to double precision numbers and yield identical results.

A. Overflow, out of range

In this case assume that the exp_int value in register 101 of FIG. 3 is equal to +140. In accordance with the IEEE Standard for Floating Point Arithmetic, this number will also include a bias of +127 (single precision). Also assume that the exp_adj value in register 103 is equal to −10 (since this value only moves the binary point there is no bias). Thus, exp_int+exp_adj=exp_result.

Substituting:

+140+bias+(−10)=+130+bias

Next, the range checking value (exp_range_chk) of −127 (with no bias; see FIG. 3) is added.

+130+bias+(−127)=+3+bias

It should be noted that the range check value with the opposite sign of the out of range limit being checked is chosen by selecting to be added to the exp_int and exp_adj. Thus, in FIG. 3, the range check value of: −127 (no bias) is used to check single precision overflow; +126—bias is used for single precision underflow; −1023 (no bias) is used for double precision overflow; and +1022—bias is used for double precision underflow. Those skilled in the art will readily comprehend how a conventional control circuit can be used to select which range check value is input to register 105, based on the floating point operation (instruction type) and whether the intermediate exponent (input to register 101) is positive or negative.

Returning to the current example, since we are determining whether an overflow condition exists and the bias has not been subtracted out, the actual binary number is used. That is, +3 = 0000 0011
+127 = 0111 1111 (bias).

Adding these numbers gives a binary number of 1000 0010. It can be seen that the MSB of this number equals "1". Therefore, an out of range condition is indicated, which is consistent with this example an exp_result equal to +130.

B. Underflow, out of range

For this example, assume the following:

exp_int=−130+bias; and exp_adj=−10.

Therefore, exp_result=−130+bias+(−10), and exp_result=−140+bias.

The exp_range_chk from FIG. 3 for underflow single is +126 minus the bias. Thus, exp_res+exp_range_chk=−140+bias+126−bias.

In this case, the bias terms cancel and the result is equal to −14 (−140+126). This a negative number, is represented in two's complement form as 1111 0010 as previously described. It should be noted that the numbers output by the hardware of FIG. 3 are in two's complement form pursuant to the above referenced IEEE Standard. Thus, it can be seen that the MSB for the two's complement number −14 is equal to "1" and an out of range condition is indicated which corresponds to the criteria of this example.

C. Overflow, in range

In this case, assume:

exp_int=+140+bias exp_adj=−20.

Therefore, exp_res=+120+bias. For overflow single precision, the exp_range_chk equals −127 (no bias). The sum of these values gives:

exp_res+exp_range_chk=+120+bias−127, which equals

−7+bias, or −7+127 (since bias=+127).

Again, this sum will be in two's complement form.

−7=0000 0111; and 1111 1000 (inverted).

Adding a +1 gives:

1111 1000
+ 0000 0001
─────────
1111 1001.

Adding the bias of +127 (0111 1111):

```
  1111 1001
+ 0111 1111
  ─────────
  0111 1000.
```

The MSB of −7+127 in two's complement form is equal to a "0" showing that the exp_result is in range.

D. Underflow, in range

Assume the following:

exp_int=−100+bias exp_adj=−10

Therefore, exp_result=−100+bias+(−10), or:

exp_result=−110+bias.

And, for underflow single precision exp_range_chk=+126−bias.

Therefore, the sum equals:

−110+bias+126−bias.

Since the bias terms cancel, the sum is +16. This is a positive number and the actual binary number is used. Therefore, +16 (binary)=0001 0000, and the MSB is seen to be "0" indicating an in range condition which is consistent with the parameters of this example.

FIG. 4 is a table of various examples of floating point numbers and how the present invention is able to generate a binary value having a MSB that indicates an out of range condition. It can be seen how the MSB of the binary numbers in the column labelled "res of add (in binary)" toggle between "0" for in range and "1" for out of range. FIG. 4 includes both single and double precision numbers. Those skilled in the art will readily comprehend how using double precision numbers in the manner as described in the previous examples will give the same "toggle" effect of the MSB of the "res of add" number, i.e. the transitioning of the MSB of the binary number output from adder 111.

Further description is now provided in conjunction with the values in FIG. 4. For the single precision overflow values in the first row of the table of FIG. 4), the desired MSB of logical 1 occurs by leaving the resultant addition from adders 109 and 111 in biased format. For example, if a single precision number is assumed with a biased intermediate exponent equal to +140 and a normalize amount (exp_adj) specified as −10, the following calculation is performed:

exp_int+exp_adj+exp_rng_chk=biased_result substituting:

(+140)+(−10)+(−127)=+3

It can be seen that the −127 exp_rng_chk value corresponds to the underflow range for a single precision calculation. More particularly, the underflow range limit for single precision is used as the range check value in determining overflow out of range conditions. In binary based (8 bit) format, +3 can be represented as 1000 0010. Notice, that the MSB value of "1" indicates that an out of range result (overflow single) has occurred. However, when determining an underflow single, the resultant number comes out exactly opposite of the desired result, i.e. the MSB is a "0" and the present invention requires that a "1" be the MSB for all out of range conditions, both overflow and underflow. For example, using the same relationship as previously described, with different values:

exp_int+exp_adj+exp_rng_chk=biased_result and, (−100)+(−30)+(+126)=(−4)

In this case the overflow range check value of (+126) is used in this out of range underflow determination. The number −4 is written in binary biased format as 0111 011, which has a MSB equal to "0", whereas a "1" is needed. In order to have the MSB for all out of range conditions be equal to "1", and additional bias must be removed from the result when calculating underflow range checks to obtain a "1" as the MSB. Using the same example for underflow single precision, as discussed above:

(−100)+(−30)+(+126−bias)=(−4).

In this case −4 is equal to 1111 1100 in binary biased format, such that the MSB is a "1", as desired. By subtracting the bias, the resulting number, −4, is represented in 2's complement form, which ensures a MSB equal to "1" for out of range conditions.

Therefore, the exp_rng_chk values have an additional bias subtracted for negative intermediate exponent values, but not for positive values. This is will cause the biased number to have an MSB value of "1" for any negative numbers. This bias mechanism will allow all values of intermediate exponent for either single or double precision numbers to have a MSB equal to "1" for all out of range conditions.

FIG. 4 illustrates several additional examples of various single and double precision, and overflow and underflow conditions. It can be seen that the MSB of the result of the binary addition of the exp_int, exp_adj and exp_rng_chk will toggle between "1" and "0" depending on the out of range condition of the resulting exponent. Each of the values designated as having a bias subtracted are in 2's complement form, all others have the appropriate bias added in, e.g. +127 for single precision and +1023 for double precision. Thus, the following constants apply: −127 for overflow single; −1023 for overflow double; +126−bias (where bias=+127) for underflow single; and +1022−bias (where bias=+1023) for underflow double.

Although certain preferred embodiments have been shown and described, it should be understood that many changes and modifications may be made therein without departing from the scope of the appended claims.

We claim:

1. A processing system, comprising:

means for computing an exponent number based on a floating point operation;

means for selecting one of a plurality of check values based on a type of instruction used in said floating point operation and whether an intermediate exponent number is positive or negative; and means for determining, based on said check value and concurrently with said computing, whether said exponent number is within a specified one of plural ranges of values.

2. A system according to claim 1 wherein each of said check values corresponds to one of said ranges of values.

3. A system according to claim 2 wherein said means for determining further comprises means for adding said selected check value to said exponent number and said intermediate exponent number to obtain a resulting number indicating whether said exponent number is within said specified range of values.

4. A system according to claim 3 wherein said resulting number is a binary number having a most significant bit indicating whether said exponent number is within said specified range of values.

5. A system according to claim 4 further comprising means for determining whether said exponent number is out of said range in a positive direction or out of said range in a negative direction.

6. A system according to claim 5 wherein said check value includes an associated bias number for determining if said exponent number is out of said specified range in the positive direction.

7. A system according to claim 6 means for subtracting said bias number from said check value for determining if said exponent number is within said specified range in the negative direction.

8. A system according to claim 7 wherein said specified range of values is alterable.

9. A computer implemented method of determining if an exponent number corresponding to a floating point operation is within a specified range of values, comprising the steps of:

computing said exponent number based on said floating point operation;

selecting one of a plurality of check values based on a type of instruction used in said floating point operation and whether an intermediate exponent number is positive or negative; and determining, based on said check value and concurrently with said computing, whether said exponent number is within said specified one of plural ranges of values.

10. A method according to claim 9 wherein each of said check values corresponds to one of said ranges of values.

11. A method according to claim 10 wherein said step of determining further comprises the step of adding said selected check value to said exponent number and said intermediate exponent number to obtain a resulting number indicating whether said exponent number is within said specified range of values.

12. A method according to claim 11 wherein said resulting number is a binary number having a most significant bit indicating whether said exponent number is within said specified range of values.

13. A method according to claim 12 further comprising the step of determining whether said exponent number is out of said range in a positive direction or out of said range in a negative direction.

14. A method according to claim 13 wherein said check value includes an associated bias number for determining if said exponent number is out of said specified range in the positive direction.

15. A method according to claim 14 further comprising the step of subtracting said bias number from said check value when determining if said exponent number is within said specified range in the negative direction.

16. A method according to claim 13 wherein said specified range of values is alterable.

* * * * *

UNITED STATES PATENT AND TRADEMARK OFFICE
CERTIFICATE OF CORRECTION

PATENT NO. : 5,553,015
DATED : September 3, 1996
INVENTOR(S) : T. A. Elliott, et. al.

It is certified that error appears in the above-indentified patent and that said Letters Patent is hereby corrected as shown below:

Col. 7, line 57, after "selecting", insert --means--;
Col. 12, line 7, delete "check values" and substitute --check value--; and
line 30, delete "13" and substitute --15--.

Signed and Sealed this

Eighth Day of April, 1997

Attest:

BRUCE LEHMAN

*Attesting Officer*　　*Commissioner of Patents and Trademarks*